United States Patent [19]

Spycher

[11] 4,264,156
[45] Apr. 28, 1981

[54] COMPOSITE GLASS-PLASTIC LENS BLANKS RESISTANT TO SHALING FRACTURE

[75] Inventor: Anton A. Spycher, Big Flats, N.Y.

[73] Assignee: Corning Glass Works, Corning, N.Y.

[21] Appl. No.: 36,796

[22] Filed: May 7, 1979

[51] Int. Cl.³ .................. C03B 11/08; G02C 7/02; G02C 7/10
[52] U.S. Cl. .................................. 351/163; 65/38; 351/166
[58] Field of Search .................. 351/159, 163, 166; 65/38

[56] References Cited

U.S. PATENT DOCUMENTS 4,168,339  9/1979  Kerko et al. .................. 351/163 X Primary Examiner—John K. Corbin
Assistant Examiner—Scott J. Sugarman
Attorney, Agent, or Firm—Kees van der Sterre; Clinton S. Janes, Jr.

[57] ABSTRACT

A glass-plastic laminated lens blank, and a molding assembly for providing such a blank by direct casting, are described, wherein the incidence of blank shaling fracture is reduced by an edge configuration which transfers the high bond stress present in the laminate from the flawed edge of the glass core to a point in the core interior which is flaw-free.

9 Claims, 7 Drawing Figures

COMPOSITE GLASS-PLASTIC LENS BLANKS RESISTANT TO SHALING FRACTURE

BACKGROUND OF THE INVENTION

The present invention is in the field of glass-plastic composites, and particularly relates to glass-plastic laminated blanks for optical and ophthalmic lenses which resist shaling fracture during lamination and finishing processes.

It has been proposed to provide laminated articles comprising glass and plastic layers which could combine the desirable properties of both plastics and glasses, e.g., the lightweight and toughness of plastics and the scratch resistance or light-responsive characteristics of glasses. For example, German Auslegeschrift No. 1,284,588 by Gliemeroth describes laminated articles comprising plastic and photochromic glass layers which could be used to provide glass-plastic laminated lenses exhibiting photochromic properties.

A particularly desirable glass-plastic laminate for optical and ophthalmic applications is a laminate comprising a thin sheet glass core element composed, for example, of photochromic glass, which is positioned between two relatively thick plastic surface layers which are bonded to the front and back surfaces of the glass core and substantially cover the front and back surfaces thereof. Such a laminate combines the very desirable properties of photochromic behavior and light weight. These laminates may be produced by the high-temperature lamination of the glass and plastic components using preformed plastic and glass sheet or by directly casting plastic resins against the glass core and curing to form the covering surface layers. The copending, commonly assigned application of S. T. Gulati et al., Ser. No. 018,107, filed Mar. 7, 1979, describes direct-cast laminated glass-plastic lenses.

One problem which has been encountered in the manufacture of laminated glass-plastic lens blanks by these processes has been the shaling fracture of the glass core which can occur as the laminated lens blank is cooled to room temperature after processing, or as it is subsequently handled and finished. The opposing plastic front and back surface layer elements, to which the glass core is strongly bonded, exhibit substantial shrinkage with respect to the glass as the laminate is cooled to room temperature following processing. This shrinkage exerts considerable tensile stress on the core, referred to as bond stress because it is in a direction normal to the glass-plastic bonding plane at the outer circumferential edge of the glass core. In the presence of this stress, midplane or shaling fracture of the glass core can be initiated by any surface defect present on the core edge. The end result is separation of the lens blank into the two plastic surface layers, each retaining a portion of the glass core layer bonded thereto.

It is a principal object of the present invention to provide a novel configuration for a laminated glass-plastic lens blank comprising a thin glass core, which lens blank exhibits improved resistance to shaling fracture of the glass core during manufacture and subsequent handling of the lens blank.

Other objects and advantages of the invention will become apparent from the following description thereof.

SUMMARY OF THE INVENTION

The present invention comprises a structural improvement in a glass-plastic laminated lens blank comprising a thin glass core positioned between and adhesively bonded to first and second plastic surface layers covering opposing surfaces of the glass core. In accordance with that improvement, a circumferential outer border region of the thin glass core is relieved from adhesive bonding with the two plastic surface layers. By relief from adhesive bonding to the plastic surface layers is meant non-bonding or essential freedom from bonding between the peripheral edge of the glass core and either of the plastic surface layers. This can be accomplished, for example, by omitting adhesives or applying release agents to the circumferential outer border region of the core prior to casting the plastic surface layers thereon, or by masking the circumferential outer border region so that it is not covered by the cast plastic.

The effect of providing an essentially stress-free circumferential outer border region on the core as described is to transfer the bond stress normally applied to the flawed circumferential edge of the core to a point within the interior of the core lamina away from the edge, which interior is flaw-free. This substantially reduces the probability of shaling fracture of the core by the bond stresses applied as the cast plastic surface layers are cooled after curing, or as the laminated lens blank is subsequently processed.

The invention further comprises a molding assembly for casting glass-plastic laminated lens blanks exhibiting improved resistance to shaling fracture during manufacture and subsequent handling. The molding assembly produces an edge configuration for the core and surface layers of the lens blank wherein the edges of the core are protected from handling damage.

BRIEF DESCRIPTION OF THE DRAWINGS

The invention may be further understood by reference to the drawings, wherein.

DETAILED DESCRIPTION

Figure 1:
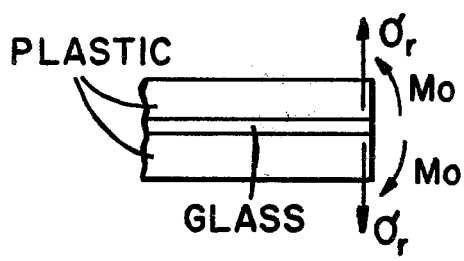
FIG. 1 is a partial elevational view in cross section of a conventional glass-plastic laminate, illustrating the forces which give rise to shaling fracture in such a laminate.
Figure 1A:
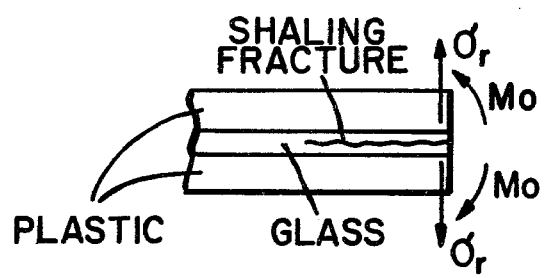
FIG. 1a illustrates the mode of shaling fracture in a conventional laminate having a glass core.

The origin of the stresses which give rise to shaling fracture in laminated lens blanks comprising a thin central glass core are illustrated in FIG. 1 of the drawing, which is a partial schematic view in cross section of the edge portion of a laminated article comprising a glass core and plastic surface layers after cooling to room temperature. Shrinkage of the plastic surface layers on curing and cooling gives rise to counterbalancing bending movements Mo in the laminate. These moments result in opposing forces $\sigma_r$, which exert a tensile stress at the edge of the glass core, referred to as bond stress.

Figure 2:
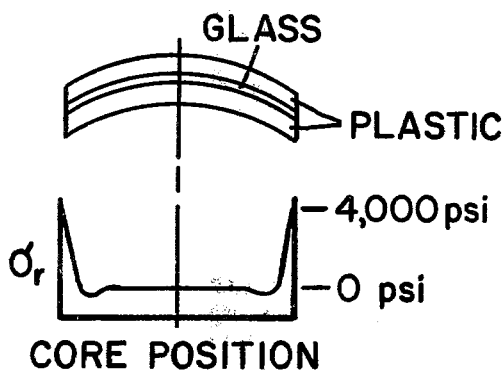
FIG. 2 is a composite diagram plotting core layer bond stress as a function of radial position for an illustrated laminated glass-plastic lens blank of a conventional type.

The location and relative magnitude of the stress applied to the edge of a glass core member in such a laminate are illustrated in FIG. 2 of the drawing, which includes a schematic elevational view in cross-section of a laminated lens blank of typical configuration, and a graph plotting room temperature bond stress in the glass core of the blank as a function of position across the lens. The plotted stress is for a laminated ophthalmic lens blank of 6-diopter front and back surface curvature, comprising a 0.015" thick glass core directly bonded to two 0.060" thick allyl diglycol carbonate plastic surface layers, after cooling from processing at 60° C. It is evident that the bond stresses arising from plastic contraction are concentrated at the outer edge of the lens blank.

Figure 3:
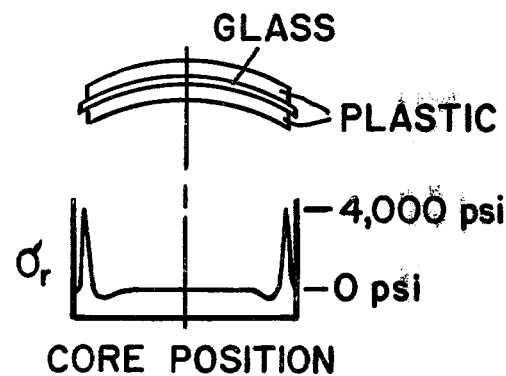
FIG. 3 is a composite diagram plotting core layer bond stress as a function of radial position for an illustrated laminated glass-plastic lens blank according to the invention.

One configuration which avoids this concentration of stress at the edge of the glass core is illustrated in FIG. 3 of the drawing, showing a laminated ophthalmic lens blank similar to that shown in FIG. 2, but wherein the edge of the glass core extend beyond the edges of the plastic surface layers. From the plot of core tensile stress versus position in the lens blank, it can be seen that, although the level of stress has not been reduced, the point of application of maximum stress has been moved to a point in the interior of the glass core which is spaced away from the edge surfaces thereof. Thus the edge of the core is essentially stress-free, while the inner regions of the core, which are free of surface flaws, can readily withstand the tensile stresses exerted on the core by the plastic surface layers.

Although the foregoing illustrations describe glass-plastic laminated lens blanks of spherically curved configuration, such as would be useful in the manufacture of ophthalmic lenses, it will be evident that the invention is not confined to such spherical lens systems. Hence, flat laminated lens blanks for optical viewports, cylindrically curved laminated sheet for cylindrical lenses, or any other useful laminate configurations, may also be provided.

The thickness of the glass and plastic layers utilized to provide laminated lens blanks according to the invention is not critical, although laminates comprising a relatively thin glass core layer and relatively thick plastic surface layers are of primary interest for optical lenses. We define a laminate having a relatively thin glass core layer as one wherein the ratio of glass core layer thickness to total laminate thickness does not exceed about 1:4. A suitable thickness range for the glass core layer is about 0.005–0.025 inches, and for the lens blank itself about 0.040–0.400 inches.

The precise method for obtaining relief from adhesive bonding between the glass and plastic elements of the laminate near the edge of the glass core member is not critical to the invention; any means for preventing bonding which can be applied to a narrow circumferential edge region of the glass core may be employed.

The use of an oversize glass core member which extends beyond the plastic surface layers, as illustrated in FIG. 2a of the drawing, is one such method. Alternatively, a release agent may be applied to a circumferential border region around the edge of the glass core element to prevent glass-plastic bonding during manufacture, or the circumferential border region can be kept free of the adhesives which are typically applied to the glass core element to promote glass-plastic bonding.

In cases where handling of the laminated glass-plastic lens blank will be required prior to final edging, lens blank configurations wherein the edges of the glass core element extend beyond both of the plastic covering layers are not preferred because glass breakage at such edges can cause shaling fracture of the laminate. An alternative configuration, which is designed to protect against damage to the glass core layer during lens blank handling, is a configuration wherein at least one of the plastic surface layers of the blank extends out to or beyond the edge of the glass core element and protects the core from inadvertent breakage.

Figure 4:
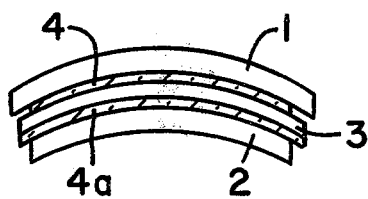
FIGS. 4–5 are schematic elevational views in cross section of additional glass-plastic laminated lens blanks having cores with stress-free circumferential outer border regions according to the invention.
Figure 5:
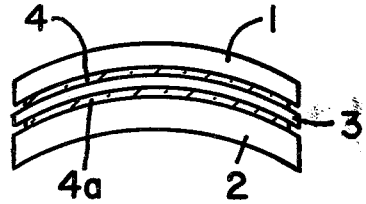

Examples of lens blanks having such a configuration are schematically illustrated in FIGS. 4–5 of the drawing. FIG. 4 is a partial elevational view in cross-section of the edge portion of a laminated lens blank incorporating first and second plastic outer layers 1 and 2 bonded to glass core 3 by means of bonding adhesive layers 4 and 4a. The thicknesses of the elements are not shown in true proportions.

As shown in FIG. 4, although plastic surface layer 1 is larger in diameter than glass core element 3, it is relieved from edge bonding with the glass core element by maintaining a circumferential border region of the glass core free of bonding adhesive 4. Further, although the layer of bonding adhesive 4a is represented as being applied at the edge as well as on central portions of the bottom surface of glass core element 3, the outer edge of glass core element 3 is relieved from stress applied by plastic surface layer 2 because of the relatively small diameter of plastic surface layer 2 with respect to glass core element 3.

Of course it is possible to leave an adhesive-free edge region on the bottom surface of glass core element 3 in cases where it is desired to extend plastic surface layer 2 out to or beyond the edge of glass core element 3. An example of a lens blank incorporating such a structure is illustrated in FIG. 5 of the drawing.

Figure 6:
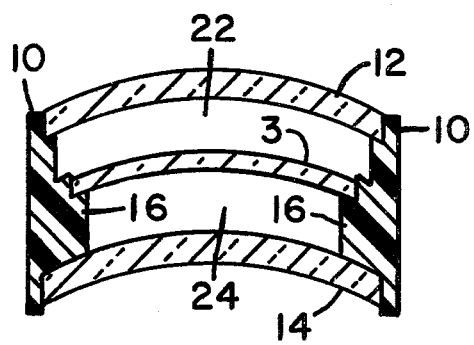
FIG. 6 illustrates a molding assembly useful for providing a laminated lens blank such as illustrated in FIG. 4.

A preferred method for manufacturing a lens blank having a configuration such as shown in FIG. 4 is to cast the plastic surface layer elements directly against the glass core member using a molding assembly such as shown in FIG. 6. That assembly comprises a cylindrical circumferential edge gasket 10 having first and second outer shell molds 12 and 14 mated therewith at opposite ends of the gasket. The gasket supports the shell molds 12 and 14 in generally coaxial spaced relationship with one another.

Held between and in generally coaxial spaced relationship with shell molds 12 and 14 by gasket 10 is glass core 3. This glass core mates with support flange 16 on the inner wall of cylindrical gasket 10 to form first and second molding chambers 22 and 24 for containing the plastic resin which is to form the plastic front and back surface layers of the lens.

The inner wall of gasket 10 incorporating support flange 16 has a configuration such that at least one of the molding chambers (in this case molding chamber 22) has a diameter at least as large (in this case larger than) the diameter of glass core 3. Hence the plastic surface layer formed in chamber 22 will extend beyond and protect glass core 3 during subsequent handling of a lens blank formed in the molding assembly.

In a preferred molding assembly such as shown in FIG. 6, the other molding chamber (in this case molding chamber 24) has a diameter smaller than that of glass core 3. Thus a plastic surface layer formed in chamber 24 would be smaller than core 3, and would not apply bond stress to the edge surface thereof.

In order to relieve the edge of core 3 from bond stress exerted by a plastic surface layer cast in chamber 22, a release agent (not shown) could be applied to the peripheral edge of core 3, or a bonding adhesive (not shown) could be applied to core 3 over all surface portions except the edge portion of that surface of core 3 which faces chamber 22. In the latter case, the cast laminated lens blank product would have an edge configuration such as shown in FIG. 3 of the drawing. The method of manufacturing the cast laminated lens blank of FIG. 4 utilizing the molding assembly of FIG. 6 is more fully shown by the following illustrative Example.

EXAMPLE

A glass core element composed of a spherically curved circular shell of photochromic glass, having a thickness of about 0.015 inches, a diameter of about 2.5 inches, and a front and back surface curvature of about 6 diopters, is selected. This glass core element is provided with a coating of a bonding adhesive which is uniform across the concave surface and covers most of the convex surface thereof, except for an adhesive-free ring around the outer edge of the convex surface. The bonding adhesive is Hughson RD3493-69 polyurethane adhesive, commercially available from Hughson Chemicals, Division of Lord Corporation, Erie, Pa.

The adhesive-coated core element is placed in an elastomeric edge gasket having a configuration such as that of gasket 10 in FIG. 6. The flanged portion of the gasket includes four short tabs positioned at equally spaced intervals around the flange circumference which extend just onto the upper, adhesive-free peripheral edge of the glass core and retain the core on the flange.

After the core element has been positioned in the gasket, top and bottom shell molds, each having a front and back surface curvature of 6 diopters, are positioned in the gasket as shown in FIG. 6. An allyl diglycol carbonate plastic molding resin, commercially available as CR-39 ® resin, is then injected into the upper and lower cavities formed between the shell molds and the glass core member.

The resin is cured by heating according to a conventional curing cycle. Thereafter the shell molds and gasket are removed from the casting to provide a cast laminated lens blank having an edge configuration substantially conforming to that illustrated in FIG. 4 of the drawing. This lens blank exhibits excellent resistance to fracturing on handling and good photochromic properties, yet is light in weight.

Of course, the foregoing example is merely illustrative of the procedures and apparatus which could be used in providing glass-plastic laminated lens blanks exhibiting improved mechanical durability as hereinabove described. Obviously, numerous variations and modifications of the embodiments particularly described herein may be resorted to by one skilled in the art within the scope of the invention as defined by the appended claims.

I claim:

1. In a glass-plastic laminated lens blank comprising a thin glass core positioned between and adhesively bonded to first and second plastic surface layers substantially covering opposing surfaces of the thin glass core, the improvement wherein a circumferential outer border region of the glass core is relieved from adhesive bonding with the two plastic surface layers such that the circumferential outer edge of the glass core is essentially stress-free.

2. A glass-plastic laminated lens blank in accordance with claim 1 wherein the ratio of glass core thickness to total lens blank thickness does not exceed about 1:4.

3. A glass-plastic laminated lens blank in accordance with claim 1 wherein the thin glass core has a thickness in the range of about 0.005–0.025 inches.

4. A glass-plastic laminated lens blank in accordance with claim 3 wherein the thin glass core is composed of photochromic glass.

5. A glass-plastic laminated lens blank in accordance with claim 1 wherein the thin glass core supports a coating of an adhesive at least partially covering the opposing surfaces thereof, and wherein the two plastic surface layers covering opposing surfaces of the thin glass core are composed of allyl diglycol carbonate resin.

6. A glass-plastic laminated lens blank in accordance with claim 5 wherein the edges of the thin glass core extend beyond the edges of the two plastic surface layers covering opposing surfaces of the glass core.

7. A glass-plastic laminated lens blank in accordance with claim 5 wherein an adhesive-free circumferential outer border region is provided on at least one surface of the glass core.

8. A glass-plastic laminated lens blank in accordance with claim 1 wherein at least the first plastic surface layer has a diameter at least as large as the diameter of the thin glass core.

9. A glass-plastic laminated lens blank in accordance with claim 8 wherein the second plastic surface layer has a diameter smaller than the diameter of the thin glass core.

* * * * *